United States Patent [19]

Sikes et al.

[11] Patent Number: 4,534,881
[45] Date of Patent: Aug. 13, 1985

[54] INHIBITION OF INORGANIC OR BIOLOGICAL CACO₃ DEPOSITION BY POLY AMINO ACID DERIVATIVES

[75] Inventors: C. Steven Sikes, Mobile, Ala.; A. P. Wheeler, Clemson, S.C.

[73] Assignee: University of South Alabama, Mobile, Ala.

[21] Appl. No.: 563,144

[22] Filed: Dec. 19, 1983

[51] Int. Cl.³ .............................................. C02F 5/10
[52] U.S. Cl. .................................. 252/180; 210/698; 252/175; 422/16
[58] Field of Search ...................... 134/22.14; 210/698; 252/82, 86, 87, 180, 181, 174.17, 546, DIG. 11; 422/16

[56] References Cited

U.S. PATENT DOCUMENTS

3,331,773  7/1967  Gunderson et al. .................... 252/82

FOREIGN PATENT DOCUMENTS

2718649  11/1977  Fed. Rep. of Germany .
1600069  5/1970  France .
197707  7/1977  U.S.S.R. .

OTHER PUBLICATIONS

J.A.C.S., vol. 75, (1953), Selma et al., "The Mechanism of Polymerization . . . ", pp. 6350–6351.
J.A.C.S., vol. 80, (1958), Idelson et al., "High Molecular Weight . . . ", pp. 4631–4634.
Struc. Aspects of Recog., (1981), "Organic Matrix Mineral Relationships . . . ", Weiner et al., pp. 467–482.
The Chem. and Biology, (1981), "Repeating Amino Acid . . . ", Weiner, pp. 517–521.
Science, vol. 212, Jun. 1981, "Control of Calcium Carbonate . . . ", (2 pages).
"Rates of Inorganic Calcium Carbonate Nucleation", Pytkowicz, pp. 196–199.
Calcif. Tiss. Res., 22, (1976), "Inhibition of Apatite Formation by Phosphorylated . . . ", Termine et al., pp. 149–157.
Calcif. Tiss. Int., 34, (1982), "Structural Factors Influencing . . . ", Williams et al., pp. 169–177.
Science, vol. 19, Dec. 1975, "Soluble Protein of the Organic Matrix . . . ", pp. 987–989.
Comp. Biochem. Physiol., vol. 70A, (1981), "Respiratory $CO_2$ and the Supply . . . ", pp. 285–291.
The Peptides, vol. 3, "Protection of Functional Groups in Peptide Synthesis", 1981, (Table of Contents).
Monsanto Technical Bulletin No. IC/SCS-3.
Biomineralization and Biological Metal Accumulation, pp. 205–247.
Sigma Chemical Co. Price List, Feb. 1983, pp. 649–654.
The Peptides, vol. 1, "Major Methods of Peptide Bond Formation", 1979, (Table of Contents).
The Peptides, vol. 2, "Special Methods in Peptide Synthesis, Part A", 1980, (Table of Contents).

*Primary Examiner*—Prince E. Willis
*Attorney, Agent, or Firm*—Oblon, Fisher, Spivak, McClelland & Maier

[57] ABSTRACT

The present invention relates to a method of inhibiting the formation of $CaCO_3$-containing deposits on a surface by applying a composition comprising an anti calcification-effective amount of a poly amino acid, a poly amino acid amide or derivative thereof. The present method is useful for the prevention and/or retardation (inhibition of inorganic scaling, as well as for the inhibition of fouling by plant or animal organisms.

15 Claims, No Drawings

INHIBITION OF INORGANIC OR BIOLOGICAL CACO₃ DEPOSITION BY POLY AMINO ACID DERIVATIVES

The work for the present invention was supported in part by grants from the National Science Foundation and the U.S. Department of Commerce, National Oceanic and Atmospheric Administration.

BACKGROUND OF THE INVENTION

1. Field of the Invention

This invention relates generally to the subject matter of inorganic and biological CaCO₃ formation. More particularly, it relates to the inhibition of CaCO₃-containing deposits by poly amino acid derivatives. These derivatives have been found effective for the inhibition of the formation of inorganic or biological CaCO₃-containing deposits on a surface with which they are contacted.

2. Description of the Prior Art

Control of CaCO₃-encrustations and growth of calcifying organisms on surfaces in marine environments has long been recognized as a potentially solvable problem. By preventing or slowing the occurrence of these "fouling" substances in organisms, the useful lifetime of surfaces such as hulls of ships and pilings of docks can be increased. In the case of hulls of ships, prevention of fouling also has the effect of allowing the ship to move more efficiently through the water.

Historically, the problem has been approached by impregnating or coating surface with compounds that interfere with the metabolism of fouling organisms. For example, the use of inhibitors of carbonic anhydrase, an enzyme often involved in calcification, has been suggested for such use (Costlow, J. D., Physiological Zoology, 32:177 (1959)). More recently, inhibitors of the enzyme polyphenol oxidase, also involved in the calcification process have been shown effective as anti-fouling compounds (Turner, R. D., Symposium on Marine Biodeterioration, Naval Institute Press, Washington, D.C.). Less specific metabolic inhibitors, such as organotin compounds, are also being applied (Good, M. L., Symposium on Marine Biodeterioration, supra).

In addition, CaCO₃ crystal growth occurs abiotically in most natural solutions leading to unwanted calcified deposits. For example, scale builds up anywhere in the sea where nucleation occurs, because sea water is supersaturated with respect to CaCO₃ by a factor of 5 to 10-fold, allowing crystal growth to proceed spontaneously (Stumm, W. and Morgan, J. J., Aquatic Chemistry, John Wiley and Sons, Somerset, N.J. (1981)). Inorganic scales are also often encountered as unwanted deposits in pipes and boilers where supersaturation becomes a problem due to evaporative concentrations of ions. Carboxylates, such as NTA, ethylene diamine tetraacetate (EDTA) and gluconates have been used to retard or inhibit the precipitation of supersaturated solutions of calcium carbonate, alrhough somewhat high concentrations are needed for these compounds to act as effective inhibitors. Hexametaphosphate at 1-10 ppm concentration was found to retard scaling, leading to the widespread use of polyphosphates as scale inhibitors in municipal and industrial water systems. (Monsanto's Technical Bulletin No. IC/SCS-323, Dequest 2010 Phosphonate).

In recirculating cooling water systems, calcium carbonate is generally the predominant scalant. Since cooling towers are efficient air scrubbers, this circulating water is saturated with CO₂, establishing an equilibrium between bicarbonate and carbonate in solution. As the pH of the water rises, this equilibrium shifts towards carbonate. Heating also produces a shift in the dissolved inorganic carbon equilibrium to the right, producing calcium carbonate:

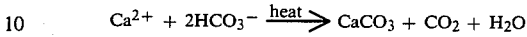

Finally, calcium carbonate shows an inverse solubility trend, being less soluble at higher temperatures. All of these factors tend to produce scaling on critical heat-transfer surfaces which reduces the heat transfer efficiency, increases frequency of required cleaning and decreases the life of the system. Several of the inhibitors of the precipitation of calciuum carbonate show the phonomenon of a threshold effect, i.e., the prevention of precipitation from supersaturated solutions of scalants by substiochiometric levels of inhibitors. Present mechanistic theories postulate that the threshold agent is absorbed on the growth sites of the scalant crystallite during the process of crystallization and alters the growth pattern so that the resultant scalant crystals are formed more slowly and are highly distorted. (Reddy M. M. and Nancollas, G. H., Desalination 12:61 (1973)).

A speculative model of organic matrix structure and function, based primarily on aspects of mollusk shell proteinaceous matrix biochemistry, as well as a brief review of the proteinaceous organic matrices from various other phyla was presented by Weiner, S., Traub, W. and Lowenstam, H. A., "Organic Matrix in Calcified Exoskeltons", in Biomineralization and Biological Metal Accum., pp. 205–224 (1983), Westbroek and De Jong, Eds., Reidel Publishing Co. Further characterization of the various matrical components, such as the soluble matrical fraction containing glycoprotein components can be found in Krampirz, G., Drolshagen, H., Hausle, J., and Hof-Irmscher, K, "Organic Matrices of Mollusk Shell", in Biomineral. and Biol. Metal Accum. supra, pp. 231–247 (1983), incorporated herein by reference. Calcium-binding, sulfated, high molecular weight glycoproteins have been identified in the soluble matrix of several species. In addition, this soluble fraction may also contain a number of smaller molecular weight glycoprotein components (Weiner, F. Lowenstam, H. A. and Hood, L. J., J. Exp. Mar. Biol. Ecol., 30:45–51 (1977), incorporated herein by reference). A further characterization of the amino acid sequence of soluble mollusk shell protein by peptide analysis after cleavage of the proteins on both sides of the Asp residues, showed a pattern of a repeating sequence of aspartic acids separated by either glycine or serine in an alternative manner with Asp. The repeating sequence observed is of the form (Asp-Y)$_n$-type, where Y is a single amino acid. The natural organic matrix of almost all mineralized tissues studied to dare (both vertebrates and invertebrates) contain proteins which are enriched in aspartic acid (Asp) and/or gluramic acid (Glu) (Veis, A. and Perry A., Biochemistry 6:2049 (1967); Shuttleworth, A. and Yeis, A., Biochem. Biophys. Acra, 257:414 (1972)).

The (Asp-Y)$_n$-type sequence was hypothesized to be present in the organic matrices from a variety of molluscan species, such as *Crassostrea virginicia, Mercenaria mercenaria, Crassostrea irredescens* and *Nautilus pompilius,* and suggested that these sequences played a function as a template for mineralization, although X-ray diffraction studies showed that there was a poor match between the Ca - Ca distances in the crystal lattice and the potential calcium-binding sites along the polypetide chain for this sequence (Weiner S., and Hood L., Science 19: 987 (1975); Weiner S., in The Chem. and Biol. of Mineral. Connective Tissues, Veis A., ed., pp., 517–521, Elsevier North Holland, Inc. (1981); and Weiner S. and Traub W., in Struct. Asp. of Recog. and Assembly in Biol. Mascromolec. Balaban, N., Sussman, J. L., Traub, W. and Yonath, A., Eds., pp. 467–482 (1981) incorporated herein by reference).

Acknowledging that the process of $CaCO_3$ nucleation and crystal growth itself is central to the process of encrustation by all calcifying organisms, such as barnacles, oysters, ship worms, algae and the like, Wheeler, A. P., George, J. W. and Evans, C. A., Science 212: 1397 (1981), incorporated herein by reference, made the discovery that a 170,000 MW glycoprotein obtained from the proteinaceous matrix that permeates the $CaCO_3$ of oyster shell is a very potent inhibitor, rather than an initiator of $CaCO_3$ nucleation and crystal growth as previously throught. The 170,000 glycoprotein was identified by staining for carbohydrates and it was shown to contain 10.2% carbohydrate by weight. The molecular weight and carbohydrare content reported for the glycoprotein form oyster shell are comparable to those observed for the protein obtained from clams by Crenshaw, M. A., Biomineralization 6: 6 (1972), incorporated herein by reference.

Wheeler, A. P., and Sikes, C. S., in concurrently filed and copending application entitled "Inhibition of the Formation of Inorganic or Biological $CaCO_3$-Containing Deposits by a Proteinaceous Fraction Obtained From $CaCO_3$-Forming Organisms", incorporated herein by reference, disclose a method of inhibiting the formation of $CaCO_3$-containing deposits with a glycoprotein-containing fraction isolated from $CaCO_3$-containing tissues obtained from $CaCO_3$-forming plants or animals. As such, the glycopeptide-like materials have been shown to have a broad range of MW ranging from 400 to $10^8$, and higher.

Sikes, C. S., and Wheeler, A. P., in concurrently filed and copending application entitled "Inhibition of Inorganic and Biological $CaCO_3$ Deposition by a Polysaccharide Fraction Obtained From $CaCO_3$-forming Organisms" incorporated herein by reference, disclose a method of inhibiting the formation of $CaCO_3$-containing deposits by applying a polysaccharide-containing fraction, substantially free of protein components, isolated from $CaCO_3$-containing tissues obtained from $CaCO_3$-forming plants or animals. As such, the polysaccharide-containing materials have been shown to have a broad range of MW ranging from 500 to $10^8$, and higher.

Sikes, C. S., and Wheeler, A. P., in concurrently filed and copending application entitled "Inhibition of Inorganic or Biological $CaCO_3$ Deposition by Synthetic Polysaccharide Derivatives", incorporated herein by reference, further disclose a method of inhibiting the formation of inorganic or biological deposition of $CaCO_3$ by applying to a surface in contact with $CaCO_3$ a synthetic saccharide polymer having a polysaccharide-matrix-like structure.

None of the cofiled, copending applications by the present inventors are considered prior art to the present invention.

However, prior to the present invention a method of preventing or inhibiting the formation of $CaCO_3$-containing deposits using an artificial polypeptide material of ready availability which operates in a specific, non-toxic manner was not known. Development of such a method will greatly aid in reducing the harmful effects of $CaCO_3$-containing deposits, such as those discussed above.

SUMMARY OF THE INVENTION

The present invention relates to a method of inhibiting the formation of $CaCO_3$-containing deposits on a surface by applying a composition comprising an anti calcification-effective amount of a poly amino acid derivative. The present method is useful for the prevention and/or retardation of inorganic scaling, as well as, for the inhibition of fouling by plant or animal organisms.

A more complete appreciation of the invention and many of the attendant advantages thereof, will be readily perceived as the same becomes better understood by reference to the following detailed decription of the present invention.

DETAILED DESCRIPTION OF THE INVENTION

Wheeler, A. P., and Sikes, S., in a concurrently filed and copending Application entitled "Inhibition of the Formation of Inorganic or Biological $CaCO_3$ Containing Deposits by a Proteinaceous Fraction obtained from $CaCO_3$-Forming Organisms", incorporated herein by reference, disclose a method of inhibiting the formation of $CaCO_3$-containing deposits by applying a glycoprotein-containing fraction isolated from $CaCO_3$-containing tissues obtained from $CaCO_3$-forming plants and animals. As such, the glycopeptide-like materials have been shown to have a broad range of MW ranging from 400 to $10^8$, and higher.

An interest in further elucidating the role played by the structural parts of the protein matrix from $CaCO_3$-forming animals in the inhibition of $CaCO_3$ encrustration and growth of calcifying organisms, prompted the present inventors to search for other potent and commercially useful inhibitors of said processes. This successful innovation and perfection, for the first time, of a method utilizing synthetic biopolymers having proteinaceous matrix-like structure, now opens the possibility of using these synthetically derived biopolymers for the inhibition of calcium carbonate deposition in pipes, boilers and the like, of widespread use in industrial environments, as well as for the prevention of fouling of surfaces in marine environments. The use of these highly potent inhibitors for the inhibition or retardation of calcium carbonate deposition has heretofore been unknown in the art.

The present invention arose from the analysis of the amino acid composition of matrices of calcified structures from molluscan shells, echinoderm skeletons, crustacens exoskeletons, coral endoskeletons and the like. The potential role of negatively charged aspartic and glutamic residues as "active sites" for nucleation and crystal formation, led the present inventors to the conclusion that synthetic polymers carrying negatively charged amino acid residues at appropriate locations within a polymeric structure would regulate the calcifying activity of the proteinaceous structures of $CaCO_3$ structure-forming plants and animal organisms.

can be used in sea water distillation plants, cooling systems, black liquor evaporators, waste concentrators, and similar equipment.

In addition, the present compounds where shown to be useful for the prevention of calcified formations by organisms such as barnacles, mollusks, sea urchins, and calcareous algae, among others. The biological formation of calcium carbonate (fouling) is a complex process intimately associated with the metabolism of the organism. The forming crystals are normally insulated from the external environment by several membranous or cellular layers. These layers represent a potential barrier that could prevent an inhibitor of calcium carbonate crystal formation, particularly macromolecular ones, from reaching the site of crystal growth. Consequently, it was surprising when Applicants' studies showed that the present peptidic polymers and derivatives thereof could inhibit biological calcification. Further, the peptidic polymers of this invention are effective in controlling calcification by both plants and animals. One possibility is that a small amount of the inhibitor in the solution where the plant or animal organism exists reaches the site of calcification, and once the inhibitor is there, the mechanism of inhibition may be similar to that occuring during inorganic calcium carbonate crystal formation in vitro. However, it is also possible that the inhibitors may interfere with the metabolism of the organism, thereby inhibiting calcification indirectly. The inventors do not propose these theories as limitations on the invention but merely intend to indicate possible mechanisms of action.

The peptidic polymers of the present invention are significantly stable polymeric structures, as shown in the examples which follow. Given the polypeptidic nature of these compounds, it would appear that they may be biodegraded and thus susceptible to deactivation through catabolism. However, the evidence suggests that the inhibitory potencies of the various polypeptides tested are preserved for up to several hours without the peptides being metabolically degraded. Further, all MW polymers are stable and maintain their calcium carbonate-forming inhibitory activity at room temperature for over 100 hours, and even longer periods of time. In addition, all the polypeptides tested have been shown to resist a treatment with moderate amounts of pressure while preserving their characteristics and activities. Moreover, all the polymers of this invention possess high stability and undiminished inhibitory activity of calcium carbonate formation when kept under refrigeration for periods of up to a year and longer.

The preparation of the various peptidic polymer derivatives of this invention can be accomplished by a variety of known methods (Gross E., Meienhofer J., "The Peptide Bond", in The Peptides: Analysis, Synthesis, Biology, Gross and Meienhofer, Eds., Academic Press, N.Y., vol. 1, pp 1–64 (1979); Johns, J. H., "Formation of Peptide Bonds, A General Survey", in The Peptides: Analysis, Synthesis, Biology; supra, pp 65–104, incorporated herein by reference.) Some of the polymers are commercially available (e.g., Sigma Catalog, pp 649–654, St. Louis, Feb. 1983). However, one of the preferred methods of preparing the homopolymers of this invention is that described in Sela, M. and Berger, A., J.A.C.S. 75: 6530 (1953), which is incorporated herein by reference. Modifications of this method are also preferred methods. PolyAsp and polyGlu can also be obtained by the method described in Idelson, M., and Blout, E. R., J.A.C.S. 80: 4631 (1958), incorporated herein by reference.

The random copolymers can be synthesized in like manner provided thar the molar quantities of the various amino acids contained in the desired polymer are taken into consideration. Thus, if a 1:1:1 Asp-Gly-Ser polymer is to be prepared, equimolar amounts of the three amino acids have to be incorporated as starting materials in the reaction mixture. The MW of the thus prepared polymers will vary over a desired range. The MW range can be varied by controlling the different variables involved in the polymerization reaction. Thus temperature, time of incubation, amounts of catalysts, polymerization initiator, and the like, can be varied for obtaining specific MW polymer ranges.

The ordered copolymers can also be prepared by known methods, such as the methods described in The Peptides: Analysis, Synthesis, Biology (Vol. 1) Chapters 1 and 2, supra, or modifications therof.

The thus prepared amino acid polymers can be utilized as such, or they can be further purified by known methods. Some of the preferred methods for the purification of the present peptides are recrystallization from appropriate solvents, gel chromatography and solvent extraction, although other methods are also contemplated herein.

The MW of the thus obtained amino acid polymers can be determined as shown by Idelson, M. and Blout, E. R., supra.

All peptides tested were found to be active as inhibitors of the formation of calcium carbonate. The relative activites shown by the various polymers are exemplified, infra. Table 1 in the Examples section includes data related to this activity. In particular, the prevention of calcium carbonate crystal growth by various MW amino acid polymers and amino acid amide derivatives thereof for an indefinite period of time is shown therein, i.e., poly aspartate (MW 20K), poly asparagine (MW 10K), poly glutmate (MW 70K and 20K), poly Glu-Tyr (MW 40K), poly Glu-Ala-Tyr (MW 40K) and poly Glu-Lys (1:4 ratio).

The synthetic inhibitors of all MW tested to date have been found to be inhibitory of the formation of calcium carbonate deposits. Included are polypeptides having a molecular weight range of 4K to 180K. Possibly, there may be an optimum molecular size for a given polymer that is the most effective inhibitor on a weight basis. This preferred size is related to the dimensions of the forming calcium carbonate crystal nucleus. From what is currently known the polypeptides having a MW of 3,500–10,000 seem to have the highest inhibitory activity of calcium carbonate crystal formation (see Table 3 in the Examples section for partial data).

The various MW polymers of this invention may be utilized directly without additives or carriers for inhibiting the deposition of calcium carbonate whether of inorganic or biological origin. Alternatively, the various polymers may be utilized by adding an effective amount of the inhibitor to a liquid in contact with a surface on which the deposits may form. Such is the case of industrially useful and commercially important containers, i.e., boilers, piping, desalinators, cooling towers, and the like. The various amino acid polymers of this invention can be added to water, water-containing liquids, or other liquids in an amount as small as 0.01 ng/ml. The upper limit for the amount of the inhibitor is only given by its solubility in the liquid to which it is added. However, if the presence of insoluble residues of The present invention discloses a method of preventing the formation of CaCO$_3$-containing deposits on a surface comprising applying to said surface a composition comprising an amino acid polymer of at least 400 MW of the formula:

poly($X_nY_m$)

wherein (1) each X, independently, is the residue of an amino acid of the formula:

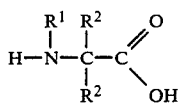

wherein (a) each $R^1$, independently, is H, $C_1$-$C_4$ alkyl, $C_2$-$C_4$ alkenyl, $C_2$-$C_4$ alkynyl, $C_1$-$C_4$ haloalkyl, $C_2$-$C_4$ haloalkenyl, $C_2$-$C_4$ haloalkynyl, halogen, $C_1$-$C_4$ alkoxy or $C_1$-$C_4$ haloalkoxy; and (b) $R^2$ is a radical ot the formula:

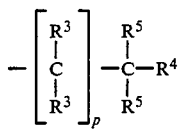

wherein (i) each $R^3$, independently, is H, $C_1$-$C_4$ alkyl, $C_2$-$C_4$ alkenyl, $C_2$-$C_4$ alkynyl, $C_1$-$C_4$ haloalkyl, $C_2$-$C_4$ haloalkenyl, $C_2$-$C_4$ haloalkynyl, halogen, OH, $C_1$-$C_4$ alkoxy or $C_1$-$C_4$ alkylamino;

(ii) each $R^4$, independently, is COOH, CONH$_2$, COR$^6$, COOR$^6$, COOM, SO$_4$H, SO$_3$NH$_2$, SO$_3$R$^6$, SO$_4$R$^6$, SO$_4$M, PO$_4$H$_2$, PO$_3$HNH$_2$, PO$_3$HOR$^6$, or PO$_2$(OR$^6$)$_2$ wherein R$^6$ is $C_1$-$C_4$ alkyl, $C_2$-$C_4$ alkenyl, $C_2$-$C_4$ alkynyl, $C_1$-$C_4$ haloalkyl, $C_2$-$C_4$ haloalkenyl, or $C_2$-$C_4$ haloalkynyl, and M is Na, K, ½ Ca or ½ Ba;

(iii) each $R^5$, independently, is $R^4$, $R^6$, H, or OH, and (iv) each p, independently, is 0–4;

(2) each Y, independently, is X wherein $R^1$ has the meanings previously defined and $R^2$ has both the meanings previously defined and further is H, $R^6$, OH, $C_1$-$C_4$ alkylamino, $C_1$-$C_4$ hydroxyalkyl, phenyl $C_1$-$C_4$ alkyl, hydroxyphenyl $C_1$-$C_4$ alkyl, or phenyl; and (3) m/n is a number from 1 to 10;

in an amount effective for inhibiting the formation of CaCO$_3$-containing deposits.

By "residue" is meant that portion of the amino acid molecule which is present in the polymer chain after reaction to form peptide bonds; e.g., —NR$^1$C(R$^2$)$_2$CO—.

Preferred amino acids are those in which $R^1$ and one $R^2$ of each residue are H and the second $R^2$ is selected from the named groups for $R^2$, whether the residue formed from the amino acid is represented by X or Y. Within the radical $R^2$ of residues represented by X, $R^3$ and $R^5$ are preferably H while $R^4$ is preferably COOH, CONH, COOR$^6$, COOM, SO$_3$H, SO$_4$H, SO$_2$NH, SO$_3$NH$_2$, SO$_2$(OR$^6$), SO$_3$(OR$^6$), SO$_3$M, SO$_4$M, PO$_4$H$_2$, PO$_3$HNH$_2$, PO$_3$HOR$^6$, or PO$_2$(OR$^6$)$_2$. $R^4$ most preferably is COOH, SO$_4$H or PO$_4$H$_2$. Residue Y is preferred to be the same as residue X or $R^2$ of Y is otherwise preferred to be H, $C_1$-$C_4$ alkyl, $C_1$-$C_4$ hydroxyalkyl, phenyl $C_1$-$C_4$ alkyl, hydroxyphenyl $C_1$-$C_4$ alkyl, or phenyl. Specific examples of particularly preferred residues are presented later in this application along with specific examples of the polyamino acids in their final form. Salts of any of the acidic residues set forth above, especially sodium and potassium salts, are also within the scope of this invention.

The polypeptidic structures of the present invention have been shown to have an effect on the rate of precipitation of CaCO$_3$ as measured by a change in the pH of a CaCO$_3$-containing solution. As such, the present invention relates to D or L amino acid polymers having a MW of approximately 400 to 10$^8$ daltons, and even higher, containing the above-indicated amino acid residues. Polymers having a MW lower than 400 show diminished anti-calcification activity. Although the upper limit for the MW of the amino acid polymer is only determined by the insolubility of these compounds in the medium, higher MW polymers may also be used, provided that the presence of the insoluble materials does not interfere with industrial operation. One of the preferred MW ranges for the present polymers is 2,000–10$^7$. Also preferred are 2,000–10$^6$ and 2,000–10$^5$ as well as 2,500–20,000. Also preferred is the MW range of 3,500–10,000 MW. The most preferred range of all MW for the peptidic polymers of the present invention is 400–8,000, although higher and lower MW ranges are also contemplated.

One of the preferred embodiments of the present invention is a homopolymer of a negatively charged amino acid and derivatives thereof. Any negatively charged D or L amino acid may be used for obtaining the homopolymer of this invention. Some of the preferred negatively charged (or acidic) amino acids are γ-carboxyglutamate (γCglu), glutamate (Glu), and aspartate (Asp). Also contemplated are homopolymers of amino acid amides. Although any amide may be used, preferred are asparagine (Asn), glutamine (Glu), and the like.

In anorher form of the present invention, the peptidic polymers may be random copolymers of a negatively charged (acidic) amino acid or an amino acid amide derivative with at least one other amino acid or amino acid amide or derivatives thereof. The other amino acid may be any amino acid, including but not limited to, small, neutral D- or L-amino acids. Preferred are alanine (Ala), glycine (Gly), tyrosine (Tyr), serine (Ser), and lysine (Lys) and amide derivatives of lysine. The ratio of the negatively charged (or acidic) amino acids or the amino acid amides to the other amino acids in the peptidic polymers may vary between 1:1 to 1:10. Preferred ratios are about 1:2, 1:3 and 1:4, although higher ratios are also contemplated.

Anothe form of the present invention encompasses ordered copolymers of negatively charged (acidic) amino acids or amino acid amides or derivatives thereof with at least one other amino acid or amino acid amide or derivatives thereof. The other amino acid or amino acid amines in the ordered copolymers can be any amino acid or amino acid amide, including, but not limited to, small neutral amino acids and amino acid amides or derivatives thereof. Some of the most preferred are Ala, Tyr, Lys, Ser and Gly and amine derivatives thereof.

The peptidic polymers of the present invention have been found to have good scale-inhibiting properties, especially for calcium carbonate scales. As such, they these polymers does not interfere with industrial operations, it may be desirable to add these inhibitors in an amount greater than that given by their solubility limit. A preferred range of the various peptide derivatives for controlling inorganic calcium carbonates scaling is $10^{-4}$–$10^2$ μg/ml. Other preferred ranges are $10^{-4}$–0.1 μg/ml and 0.1–$10^2$ μg/ml of the various polymeric derivatives.

When the present inhibitors are utilized for their anti fouling characteristics in order to prevent the encrustations of plant or animal organisms, they can be added to a liquid, such as water, water-containing liquids or other non-aqueous liquids, preferably an amount about 0.001–1,000 μg/ml, although larger amounts can also be used. Used within this range of concentrations, the present inhibitors find an application in the prevention of encrustration of organisms in, e.g., running water piping or sewage piping, among others.

The present inhibitors can also be applied directly to a surface before it becomes in contact with $CaCO_3$-containing liquids, e.g., industrial containers, marine surfaces such as those in piers, ships, and the like. The present inhibitors may be applied by themselves or in combination with other salt deposition inhibitors, anti-rust agents, or the like and/or with a carrier, directly to the exposed surface, or they may be mixed with other polymers used for the protection of said surfaces. A variety of carriers are contemplated for the application of the present inhibitors. Some of the most common carriers include aqueous and non-aqueous liquids, gels, oils, organic and inorganic solvents, compressed gases, and the like. However, any carrier may be used according to the needs. When used in high concentrations by themselves, the poly amino acid inhibitors of this invention may be highly viscous and can be easily applied to a surface. After the application of the inhibitors, an appropriare length of time may be allowed for the penetration of the inhibitor into the surface, as is the case with porous surface materials, such as wood, ceramics and the like. Thus, a large storage of the present inhibitors is created within the material and the surface may then be partially sealed with a coat-forming polymer to retard release of the active component. Alternatively, the various MW polymers may be mixed with a carrier to form a suspension which can be applied to a surface. The present inhibitors may be applied to any type of surface which may be exposed to the formation of inorganic or biological $CaCO_3$ deposits. Some of the most common materials to which the present inhibitors may be applied are metals, woods, synthetic polymers and copolymers, glass, ceramics, and painted or otherwise coated surfaces, although other matrials are also contemplated. When in contact with the $CaCO_3$-containing liquid, the inhibitors will slowly leach out from underneath the polymeric coating layer. The present inhibitors may further be applied in admixture with the coat-forming polymer, e.g., paints or any synthetic polymer used for the protection of surfaces such as polyurethanes. When the present inhibitors are used in admixture with a coat-forming polymer, they can be used in a concentration of between 0.001–90% by weight of the total composition, although higher or lower concentrations are also contemplated in this invention. Some of the preferred concentrations are 1–75% by weight. Other preferred concentrations are 5–25%, 25–50% and 10–40% by weight. When applied to a surface the present inhibitors may be formulated with a carrier in the form of powder, solution, suspension, gel, oil, aerosol, paste or viscous colloid.

The invention being generally described, a more complete understanding can be attained by reference to the examples which are provided herein for purposes of illustration only, and are not intended to be limiting unless otherwise specified.

EXAMPLES

Stability of Peptidic Polymers Which are Inhibitory of $CaCO_3$ Formation, Versus Temperature and Pressure In many applications, calcareous scales are formed under conditions of elevated temperature and pressure. Experiments have revealed that the present inhibitors are stable under such conditions. They are also stable at room temperature for extended periods, and can be kept in solution under normal refrigeration (5° C.) for at least one year without loss of potency.

1. Solutions of polyaspartate and polyglutamate of various concentrations were subjected to 120° C. and 18 psi in an autoclave for 1 hour. The potencies of these solutions as inhibitors of $CaCO_3$ formation were measured using the crystallization assay, infra, (pH 8.3, 20° C.) before and after autoclaving. No changes in potencies were detected.

2. The polyamino acid inhibitors have been tested for stability versus time at room temperature (20° to 25° C.). In these experiments, the stability of the inhibitors to prevent $CaCO_3$ formation in the crystallization assay for 120 hours was measured. The concentration of inhibitors required to achieve this are shown in Table 1, infra.

3. Stock solutions of the different polyamino acid inhibitors have been maintained under normal refrigeration in sealed containers for up to a year. Their potencies, a measured using the crystallization assay, were not found to diminish during this period. In some cases, 0.02% by weight of sodium azide was added to the stock solutions of inhibitors approximately 500 μg/ml distilled water) to prevent bacterial contamination.

TABLE 1

INHIBITION OF $CaCO_3$ FORMATION BY SOME NATURAL AND SYNTHETIC COMPOUNDS

| Compound | Type | Initial pH of Assay | Duration of Lag Phase Prior to Crystal Growth | Inhibitor Concentration μg/ml |
|---|---|---|---|---|
| None | Control | 9.5 | 6.46 min ± 2.11* (n = 30)** | Zero |
| None | Control | 8.3 | 6.11 min ± 4.05* (n = 25) | Zero |
| Oyster Shell Soluble Matrix | Glycoprotein | 9.5 | Indefinite*** (n = 20) | 1.20 |
| Oyster Shell Soluble Matrix | " | 8.3 | Indefinite (n = 10) | 0.10 |
| Oyster Shell Soluble Matrix, Peak 3 | Glycoprotein Fraction | 8.3 | Indefinite (n = 10) | 0.080 |
| Sea Urchin Skeleton Soluble Matrix | Proteinaceous | 8.3 | Indefinite (n = 3) | 0.60 |

TABLE 1-continued
INHIBITION OF CaCO$_3$ FORMATION BY SOME NATURAL AND SYNTHETIC COMPOUNDS

| Compound | Type | Initial pH of Assay | Duration of Lag Phase Prior to Crystal Growth | Inhibitor Concentration μg/ml |
|---|---|---|---|---|
| Polyaspartate (MW 20K) | Carboxypoly-peptide | 9.5 | Indefinite (n = 20) | 1.2 |
| Polyaspartate (MW 20K) | Carboxypoly-peptide | 8.3 | Indefinite (n = 10) | 0.027 |
| Polyasparagine (MW 10K) | Amine form of Polyasparate | 8.3 | Indefinite (n = 3) | 1.0 |
| Polyglutamate (MW 70K) | Carboxypoly-peptide | 9.5 | Indefinite (n = 10) | 1.4 |
| Polyglutamate (MW 70K), (MW 20K) | Carboxypoly-peptide | 9.5 | Indefinite (n = 10) | 10.0 |
| Poly Glu—Tyr (MW 40K) | Polypeptide, Random Copolymer | 9.5 | Indefinite (n = 10) | 3.5 |
| Poly Glu—Ala—Tyr (MW 40K) | Polypeptide, Random Copolymer | 9.5 | Indefinite (n = 6) | 5.0 |
| Poly Glu—Lys (1 Gly:4 Lys) | Polypeptide, Random Copolymer | 9.5 | Same as Control, (n = 3) | 20.0 |
| Pectin | Carboxypoly-saccharide | 8.3 | 86 min (n = 3) | 1.8 |
| Alginate | Carboxypoly-saccharide | 8.3 | Indefinite (n = 20) | 7.2 |
| Polygalacturonate | Carboxypoly-saccharide | 8.3 | Same as Control, (n = 3) | 10.0 |
| Carageenans, Types 3,4,5 | Sulfated Poly-saccharides | 8.3 | " | 1.8 |
| Heparin, Chondroitins A,C | Sulfated Poly-saccharides | 8.3 | " | 20.0 |
| Neutral, Polyamino Acids | Polypeptides | 9.5 | " | 20.0 |
| Positive Polyamino Acids | " | 9.5 | " | 20.0 |
| Free Amino Acids, All Types | Monomers | 9.5 | " | 20.0 |
| Polyacrylate (MW 70K) | Carboxypolymer (Industrial) | 9.5 | Indefinite (n = 3) | 10.0 |
| HEDP (MW 208) | Phosphonate (Industrial) | 8.3 | Indefinite (n = 6) | 0.06 |

*Standard Deviation
**Number of Replicate Experiments
***Experiment run for at least 3 hours, at most 120 hours; concentrations less than these amounts result in finite lag phases.

CaCO$_3$ CRYSTALLIZATION STUDIES: POTENCY OF NATURAL SOLUBLE MATRICES AND THEIR SYNTHETIC ANALOGS

1. pH-Drift Assays pH 9.5 Assay. Inhibitory compounds were added to 30 ml of a synthetic sea water (500 mM NaCl, 10 mM KCl) containing Ca at 30 mM and dissolved inorganic carbon (DIC) at 2 mM. The pH of the solution was adjusted to 9.5 by titration with 1.0 N NaOH. Crystals of CaCO$_3$ began to grow spontaneously in the absence of inhibitors after a characteristic induction period (lag phase) during which the solution is stable. Upon initiation of crystal growth at the end of the lag phase, the pH of the solution begins to drop as a result of equilibrium shifts that accompany removal of Co$_3{}^{2-}$ ions from solution. The rate of crystal growth was monitored by recording the decrease in pH per unit time (slope of the logarithmic phase). Potencies of inhibitors were compared according to their effect on duration of the lag phase prior to crystal growth and their effect on rate of crystal growth at intermediate concentrations of inhibitors.

pH 8.3 Assay. The same conditions described above were used in this assay except that the synthetic sea water contained 10 mM Ca and 10 mM DIC, and the starting pH was 8.3. At concentrations of the inhibitors that result in partial inhibition, both the rate and total amount of crystal growth was decreased relative to controls in which no inhibitor was added.

The potencies of various inhibitors as measured using the pH-drift assay are shown in Table 1.

2. pH-Stat Assay

The ability of polyaspartate (14,000 dalton MW range) to inhibit the rate of calcium carbonate precipitation was tested in 25 ml of media containing 500 mM NaCl and 10 mM KCl. To this media, 500 μl of 0.5 M NaHCO$_3$ were added to give a final concentration of 10 mM total DIC, and the pH adjusted to 8.4–8.5. Calcium chloride (125 μl of 2 M) was then added to the solution to a final concentration of 10 mM. After the ensuing pH transient, the pH was adjusted to 8.30. The induction period was normally about 2 min, after which precipitation would start slowly and then increase to a relatively constant rate. During precipitation, the pH was held constant using a pH-stat system (Metrohm Dosimat 655; Impulsomat 614) and a 0.5 M NaOH titrant. The inhibitor to be tested wa added to the medium after 25μ moles of NaOH had been titrated, at which time the rate of titration was constant. Inhibition was calculated as the ratio of the rate of titration after inhibitor addition to the rate of titration before inhibitor addition. Polyaspartate (14K) was found to be highly inhibitory at 0.5 to 1.0 μg/ml.

Effect of pH of Potency of Compounds that Inhibit CaCO$_3$ Formation

A comparison of the potencies of polyAsp and poly-Glu with the whole soluble matrix of oyster shell, at pH 9.5 and pH 8.3 revealed increased potencies at the lower pH. The comparisons were made relative to control experiments at pH 9.5 and 8.3 in which the solutions were matched for degree of stability as indicated by the duration of lag periods prior to crystal growth. (Table 2)

It appears possible that the increased potency of the compounds at pH 8.3 relative to pH 9.5 results from a conformational shift in the molecules rather than to changes in ionizable groups. In any event, it appears that the compounds are effective over a range of pH values, i.e., 7 to 11, and that the concentrations of inhibitors needed varies with pH.

TABLE 2

EFFECT OF pH ON POTENCY OF POLYASPARATE, AND POLYGLUTAMATE. MEASUREMENTS WERE MADE BY USE OF THE CRYSTALLIZATION ASSAY, 20 TO 23° C.

| Treatment | Inhibitors, μg/ml | Initial pH | Duration of Lag Phase prior to Crystal Growth, minutes |
|---|---|---|---|
| Control | none | 9.5 | 6.46 ± 2.11 (n = 30) |
| Control | none | 8.3 | 6.11 ± 4.05 (n = 25) |
| SM | 1.20 | 9.5 | Indefinite* (n = 20) |
| SM | 0.10 | 8.3 | Indefinite (n = 10) |
| Polyaspartate | 1.20 | 9.5 | Indefinite (n = 20) |
| Polyaspartate | 0.030 | 8.3 | Indefinite (n = 10) |
| Polyglutamate | 1.40 | 9.5 | Indefinite (n = 10) |
| Polyglutamate | 0.10 | 8.3 | Indefinite (n = 3) |

*Experiments were run for at least 3 and at most 120 hours.

Although the negatively charged groups attached to the polymeric backbones, particularly the carboxyl groups, no doubt are essential to the complete activity of the inhibitors, it is important to note that polyasparagine has considerable capacity to regulate $CaCO_3$ crystal formation. This is significant because the repeating carboxylic oxygens of polyasparatate are replaced by amine groups in polyasparagine. This suggests that more subtle interactions in addition to direct ionic interactions are involved in the action of the inhibitors. For example, the integrity of repeating sequences of carbonyl groups (C=O) may play a critical role in inhibition, with repetitive carboxyl groups (COO) being a particularly effective example of this more general arrangement. This possibility is substantiated in part by the fact that polyaspartate (MW 14K) retained most of its activity even when the carboxyl groups are esterified to glycine by the method of Hoare, D. G. and Koshland, D. E., Jour. Biol. Chem., 242: 2447-2453 (1967).

Effect of Temperature of Potency of Compounds That Inhibit $CaCO_3$ Formation

1. Under defined conditions, temperature was shown to exert a striking control over $CaCO_3$ nucleation and crystal growth. Even small increases in temperature can lead to marked increases in rate of crystal formation and growth. Consequently, the effective dose of a compound required to inhibit crystal formation may vary directly with temperature. For a given solution, as temperature increases, the amount of inhibitor needed to control crystal formation also increases (Table 3)

TABLE 3

EFFECT OF TEMPERATURE ON POTENCY OF POLYASPARATE AND POLYGLUTAMATE AS INHIBITORS OF $CaCO_3$ FORMATION. POTENCIES WERE MEASURED USING THE CRYSTALLIZATION ASSAY WITH INITIAL pH 8.3

| Treatment | Concentration of Inhibitor μg/ml | Temp. °C | Lag Phase prior to Crystal Growth Minutes | Rate of Crystal Growth in Lag phase pH/min |
|---|---|---|---|---|
| Control | none | 30 | 2 | 0.087 |
| Polyaspartate (MW 20K) | 0.162 | 30 | 9.5 | 0.075 |
| Polyglutamate (MW 21K) | 0.144 | 30 | 3.3 | 0.088 |
| Whole Soluble Matrix (SM) oyster shell | 0.050 | 30 | 5.0 | 0.079 |
| Control | none | 25 | 3.6 | 0.054 |
| Polyaspartate | 0.162 | 25 | 101 | 0.021 |
| Polyglutamate | 0.144 | 25 | 14.5 | 0.039 |
| SM, oyster shell | 0.050 | 25 | 10.2 | 0.042 |
| Control | none | 20 | 19 | 0.023 |
| Polyaspartate | 0.162 | 20 | indefinite* | NA |
| Polyglutamate | 0.144 | 20 | 200 | 0.009 |
| SM, oyster shell | 0.050 | 20 | 135 | 0.014 |
| Control | none | 15 | 41.5 | 0.016 |
| Polyaspartate | 0.162 | 15 | indefinite | NA |
| Polyglutamate | 0.144 | 15 | " | " |
| SM, oyster shell | 0.050 | 15 | " | " |
| Control | none | 10 | 137 | 0.006 |
| Control | none | 5 | indefinite | NA |

*Indefinite = greater than 210 minutes.
NA Not applicable.

Effect of MW on the Potency of the Polymers For Inhibiting $CaCO_3$ Formation

The inhibitory activity of various MW polymers for the $CaCO_3$ formation was measured using the crystallization assay, supra, with an initial pH of 8.3 at 20° C. The results obtained from the different MW inhibitors are shown in Table 4.

TABLE 4

EFFECT OF MOLECULAR WEIGHT OF POLYASPARATE AND POLYGLUTAMATE ON THEIR POTENCY AS INHIBITORS OF $CaCO_3$ FORMATION.

| Treatment | Molecular Weight daltons | Concentration μg/ml | Lag Phase Prior to Crystal Growth Minutes |
|---|---|---|---|
| Control | — | — | 6 |
| Polyaspartate | 8,500 | 0.05 | 120 |
| " | 14,000 | " | 76 |
| " | 20,000 | " | 32 |
| Control | — | — | 6 |
| Polyglutamate | 4,100 | 0.09 | 75 |
| " | 21,000 | " | 34 |

TABLE 4-continued
EFFECT OF MOLECULAR WEIGHT OF POLYASPARATE AND POLYGLUTAMATE ON THEIR POTENCY AS INHIBITORS OF CaCO$_3$ FORMATION.

| Treatment | Molecular Weight daltons | Concentration μg/ml | Lag Phase Prior to Crystal Growth Minutes |
|---|---|---|---|
| " | 70,000 | " | 18 |

Potencies were measured using the crystallization assay with initial pH at 8.3 and temperature regulated at 20° C.

The invention now being fully described, it will be apparent to one of ordinary skill in the art that many changes and modifications can be made thereto, without departing from the spirit or scope of the invention as set forth therein.

What is claimed as new and desired to be secured by Letters Patent of the United States is:

1. A method of inhibiting the formation of CaCO$_3$-containing deposits on a surface, comprising:
applying to said surface an anticalcifying composition comprising an amino acid polymer of at least 400 MW of the formula:

$$\text{poly}(X_n Y_m)$$

wherein
(1) each X, independently, is the residue of an amino acid of the formula:

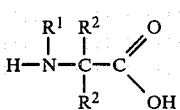

wherein
(a) each $R^1$, independently, is H, $C_1$-$C_4$ alkyl, $C_2$-$C_4$ alkenyl, $C_2$-$C_4$ alkynyl, $C_1$-$C_4$ haloalkyl, $C_2$-$C_4$ haloalkenyl, $C_2$-$C_4$ haloalkynyl, halogen, $C_1$-$C_4$ alkoxy or $C_1$-$C_4$ haloalkoxy; and
(b) $R^2$ is a radical of the formula:

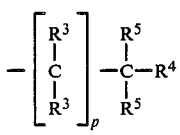

wherein
(i) each $R^3$, independently, is H, $C_1$-$C_4$ alkyl, $C_2$-$C_4$ alkenyl, $C_2$-$C_4$ alkynyl, $C_1$-$C_4$ haloalkyl, $C_2$-$C_4$ haloalkenyl, $C_2$-$C_4$ haloalkynyl, halogen, OH, $C_1$-$C_4$ alkoxy or $C_1$-$C_4$ alkylamino;
(ii) each $R^4$, independently, is COOH, CONH$_2$, COR$^6$, COOR$^6$, COOM, SO$_4$H, SO$_3$NH$_2$, SO$_3$R$^6$, SO$_4$R$^6$, SO$_4$M, PO$_4$H$_2$, PO$_3$HNH$_2$, PO$_3$HOR$^6$, or PO$_2$(OR$^6$)$_2$ wherein $R^6$ is $C_1$-$C_4$ alkyl, $C_2$-$C_4$ alkenyl, $C_2$-$C_4$ alkynyl, $C_1$-$C_4$ haloalkyl, $C_2$-$C_4$ haloalkenyl, or $C_2$-$C_4$ haloalkynyl, and M is Na, K, ½ Ca or ½ Ba;
(iii) each $R^5$, independently, is $R^4$, $R^6$, H, or OH, and
(iv) each p, independently, is 0-4;
(2) each Y, independently, is X wherein $R^1$ has the meanings previously defined and $R^2$ has both the meanings previously defined and further is H, $R^6$, OH, $C_1$-$C_4$ alkylamino, $C_1$-$C_4$ hydroxyalkyl, phenyl $C_1$-$C_4$ alkyl, hydroxyphenyl $C_1$-$C_4$ alkyl, or phenyl; and
(3) m/n is a number from 1 to 10; in an amount effective for inhibiting the formation of CaCO$_3$-containing deposits.

2. The method of claim 1 wherein the amino acid polymer has a MW of 2,000-10$^7$.

3. The method of claim 2 wherein the amino acid polymer has a MW of 2,000-10$^6$.

4. The method of claim 3 wherein the amino acid polymer has a MW of 2,500-20,000.

5. The method of claim 4 wherein the amino acid polymer has a MW of 3,500-10,000.

6. The method of claim 1 wherein the surface comprises a material selected from the group consisting of wood, glass, ceramic, metal, synthetic polymers and copolymers, and painted or otherwise coated surfaces.

7. The method of claim 1 wherein said composition further comprises a carrier in the form of a powder, solution, suspension, gel, oil, aerosol, paste or viscous colloid.

8. The method of claim 1 wherein the CaCO$_3$-containing deposit comprises a CaCO$_3$-forming organism.

9. The method of claim 1 wherein at least 10$^{-4}$ μg/ml of the amino acid polymer is added to a liquid in contact with said surface.

10. The method of claim 8 wherein 0.001%-90% by weight of the composition is the amino acid polymer.

11. The method of claim 9 wherein about 0.001-1,000 μg/ml of the amino acid polymer are added to said liquid.

12. The method of claim 7 wherein the carrier is a paint.

13. The method of claim 1 wherein the amino acid polymer is formed from an amino acid selected from the group consisting of aspartate, glutamate, γ-carboxyglutamate, asparagine, glutamine, and mixtures thereof.

14. The method of claim 1 wherein the amino acid polymer is formed from at least one amino acid selected from the group consisting of aspartate, glutamate, γ-carboxyglutamate, asparagine and glutamine in combination with at least one other amino acid selected from the group consisting of glycine, alanine, serine and lysine.

15. The method of claim 14 wherein the amino acid polymer is selected from the group consisting of polyaspartate, polyglutamate, poly-γ-carboxyglutamate, polyasparagine, polyglutamine, polygluramine-asparagine, polyglutamate-asparate, polyglutamate-γ-carboxyglutamate, polyasparate-γ-carboxyglutamate, polyaspartate-glycine, polyaspartate-alanine, polyaspartate serine, polyaspartate-lysine, polyglutamate-glycine, polyglutamate-alanine, polyglutamate-serine, polyglutamate-lysine, polyasparagine-glycine, polyasparagine-alanine, polyasparagine-serine, polyasparaginelysine, polyglutamine-glycine, polyglutamine-alanine, polyglutamine-serine, polyglutamine-lysine, poly-γ-carboxyglutamate-glycine, poly-γ-carboxyglutamate-alanine, poly-γcarboxyglutamate-serine and poly-γ-carboxyglutamate-lysine.

* * * * *

UNITED STATES PATENT AND TRADEMARK OFFICE
CERTIFICATE OF CORRECTION

PATENT NO. : 4,534,881

DATED : August 13, 1985

Page 1 of 3

INVENTOR(S) : C. Steven Sikes and A. P. Wheeler

It is certified that error appears in the above-identified patent and that said Letters Patent is hereby corrected as shown below:

On page 1, under "OTHER PUBLICATIONS", in the second column, line 2, delete "(2 pages)" and insert therefor --Wheeler et al, pp. 1397-1398--.

On page 1, under "OTHER PUBLICATIONS", in the second column, line 3, insert --J. Geol., vol. 73, (1965),-- before " "Rates ".

In the ABSTRACT, change "(inhibition" to --(inhibition)--.

At column 1, line 32, change "surface" to --surfaces--.

At column 1, line 59, change "alrhough" to --although--.

At column 2, line 18, change "calciuum" to --calcium--.

At column 2, line 19, change "phonomenon" to --phenomenon--.

At column 2, line 39, change "Krampirz" to --Krampitz--.

At column 2, line 47, change "F." to --S.--.

At column 2, line 58, change "dare" to --date--.

At column 2, line 60, change "gluramic" to --glutamic--.

At column 2, line 62, change "Yeis" to --Veis--.

At column 3, line 23, change "throught" to --thought--.

UNITED STATES PATENT AND TRADEMARK OFFICE
CERTIFICATE OF CORRECTION

PATENT NO. : 4,534,881
DATED : August 13, 1985
INVENTOR(S) : C. Steven Sikes and A. P. Wheeler It is certified that error appears in the above-identified patent and that said Letters Patent is hereby corrected as shown below:

At column 3, line 26, change "carbohydrare" to --carbohydrate--.

At column 3, line 27, change "form" to --from--.

At column 4, line 16, after "as well as" delete --,--.

At column 4, line 28, change "Application" to --application--.

At column 4, line 60, change "crustacens" to --crustaceans--.

At column 5, line 24, insert --H or-- after "is" and change "ot" to --of--.

At column 6, line 40, change "anorher" to --another--.

At column 6, line 55, change "Anothe" to --Another--.

At column 8, line 39, change "glutmate" to --glutamate--.

At column 9, line 37, change "appropriare" to --appropriate--.

At column 10, line 49, change "a" to --as--.

At column 10, line 52, change "approximately" to --(approximately--.

At column 11, Table 1, fifth entry, under the word "Polyglutamate" delete "(MW 70K)".

UNITED STATES PATENT AND TRADEMARK OFFICE
CERTIFICATE OF CORRECTION

PATENT NO. : 4,534,881

DATED : August 13, 1985

INVENTOR(S) : C. Steven Sikes and A. P. Wheeler

It is certified that error appears in the above-identified patent and that said Letters Patent is hereby corrected as shown below:

At column 11, line 54, change "$CO_3^{2-}$" to --$CO_3^{2-}$--.

At column 12, line 56, change "wa" to --was--.

At column 13, line 62, change "polyasparatate" to --polyaspartate--.

At column 14, in the titles of Table 3 and Table 4, change "POLYASPARATE" to --POLYASPARTATE--.

At column 15, in the title of Table 4, change "POLYASPARATE" to --POLYASPARTATE--.

At column 15, line 41, insert --H or-- after "is".

At column 16, line 51, change "polygluramine" to --polyglutamine--.

Signed and Sealed this

Eighteenth Day of February 1986

[SEAL]

Attest:

DONALD J. QUIGG

Attesting Officer

Commissioner of Patents and Trademarks